US008429910B2

(12) United States Patent  (10) Patent No.: US 8,429,910 B2
Ghouse  (45) Date of Patent: *Apr. 30, 2013

(54) FREE FLOATING WAVE ENERGY CONVERTER

(76) Inventor: Syed Mohammed Ghouse, Hyderabad (IN)

( * ) Notice: Subject to any disclaimer, the term of this patent is extended or adjusted under 35 U.S.C. 154(b) by 384 days.

This patent is subject to a terminal disclaimer.

(21) Appl. No.: 12/845,400

(22) Filed: Jul. 28, 2010

(65) Prior Publication Data

US 2011/0006531 A1  Jan. 13, 2011

Related U.S. Application Data

(63) Continuation-in-part of application No. 11/997,662, filed as application No. PCT/IN2006/000273 on Aug. 1, 2006, now Pat. No. 7,823,380.

(30) Foreign Application Priority Data

Aug. 2, 2005 (IN) .............................. 694/KOL/2005

(51) Int. Cl.
*F03B 13/18* (2006.01)
*F04F 99/00* (2009.01)

(52) U.S. Cl.
USPC .................. 60/502; 60/497; 60/501; 417/100

(58) Field of Classification Search ............ 60/495–497, 60/499, 501, 502, 504; 417/100, 330, 331, 417/333; 290/42, 53; 441/133
See application file for complete search history.

(56) References Cited

U.S. PATENT DOCUMENTS 3,335,667 A * 8/1967 Murphy ........................ 417/246
4,163,633 A   8/1979 Vriend
(Continued)

FOREIGN PATENT DOCUMENTS

GB  2024957 A    1/1980
GB  2133477 A *  7/1984
(Continued)

OTHER PUBLICATIONS

Database WPI; Section PQ, Week 198526; Derwent Publications Ltd., London, GB; Class Q55, AN 1985-158007; XP002372600 "Wave power installation guide—has ballast tank at start section of pipe and uniformly positioned check valves over pipe length to increase pressure head".

(Continued)

*Primary Examiner* — Kenneth Bomberg
*Assistant Examiner* — Christopher Jetton
(74) *Attorney, Agent, or Firm* — Fraser Clemens Martin & Miller LLC; William J. Clemens

(57) ABSTRACT

A wave energy converter includes a flexible pipe and an inlet. The flexible pipe floats on the water surface, following the wave form. Slugs of water and air enter, one after the other, through the inlet. Because the flexible pipe follows the shape of the wave, water is transported through a manifold to a pressure chamber connected to a generator. The inlet consists of a hollow, inflexible pipe attached to the throat of the flexible pipe. The inflexible pipe is fixedly attached to a buoyancy tank or plurality thereof. The buoyancy tanks are arranged in a vertical plane or in tandem, with the inflexible pipe passing along the plane vertical to the fore and aft axis of the buoyancy tank and the frontward portion projecting sufficiently ahead of the buoyancy tank with the flexible pipe terminating at a singular outlet. The entire apparatus is facing towards the oncoming waves.

20 Claims, 8 Drawing Sheets

FLEXABLE PIPE
"SLUGS UNDER PRESSURE"

U.S. PATENT DOCUMENTS

| | | | |
|---|---|---|---|
| 4,672,222 | A | 6/1987 | Ames |
| 5,808,368 | A | 9/1998 | Brown |
| 8,120,195 | B2 * | 2/2012 | Pollack et al. .................. 290/53 |
| 2006/0090463 | A1 | 5/2006 | Burns et al. |

FOREIGN PATENT DOCUMENTS

| | | | |
|---|---|---|---|
| JP | 3151572 A | | 6/1991 |
| RU | 2004837 C1 | * | 12/1993 |
| SU | 1129407 A | * | 12/1984 |
| SU | 1129407 A1 | | 12/1984 |
| WO | 8400583 A1 | | 2/1984 |
| WO | 2006067421 A1 | | 6/2006 |
| WO | WO 2006067421 A1 | * | 6/2006 |

OTHER PUBLICATIONS

Database WPI, Week 199414; Derwent Publications Ltd., London, GB; Class Q55, AN 1994-116500; XP002406517 "Wave driven power generating unit—has meshed filter placed on conical headpiece, and anchor, and flexible sleeve made of separate sections connected to each other by flanges".

MacMillin, David M., Ewbank's Hydraulics—Wirtz' Pump, Jun. 20, 1998, http://www.marcdatabase.com/~lemur/rbt-scoopwheel.html.

Mortirner, G.H., The Coil Pump—Theory and Practice; Journal of Hydraulic Research, vol. 22 1984, No. 1, pp. 9-22.

* cited by examiner

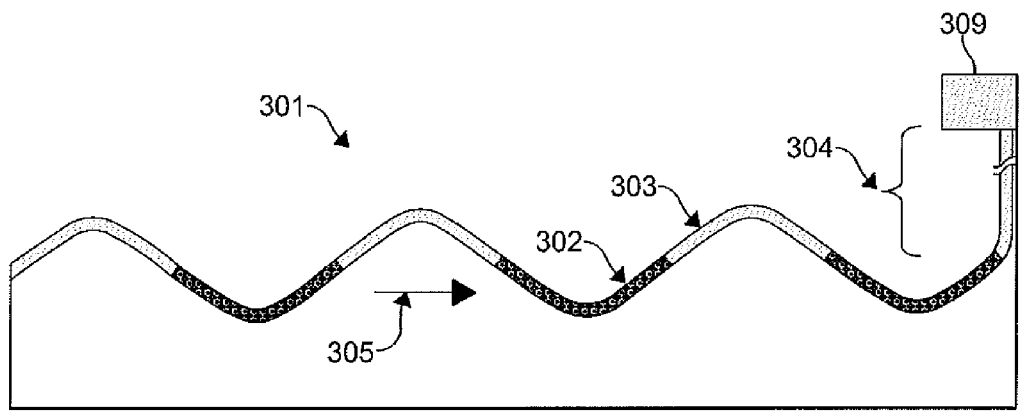
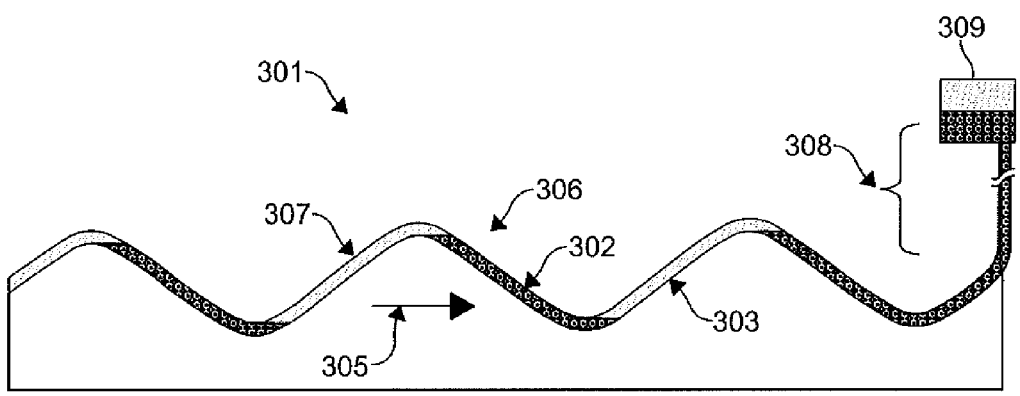
**FIG. 3 - FLEXABLE PIPE
"SLUGS UNDER PRESSURE"**

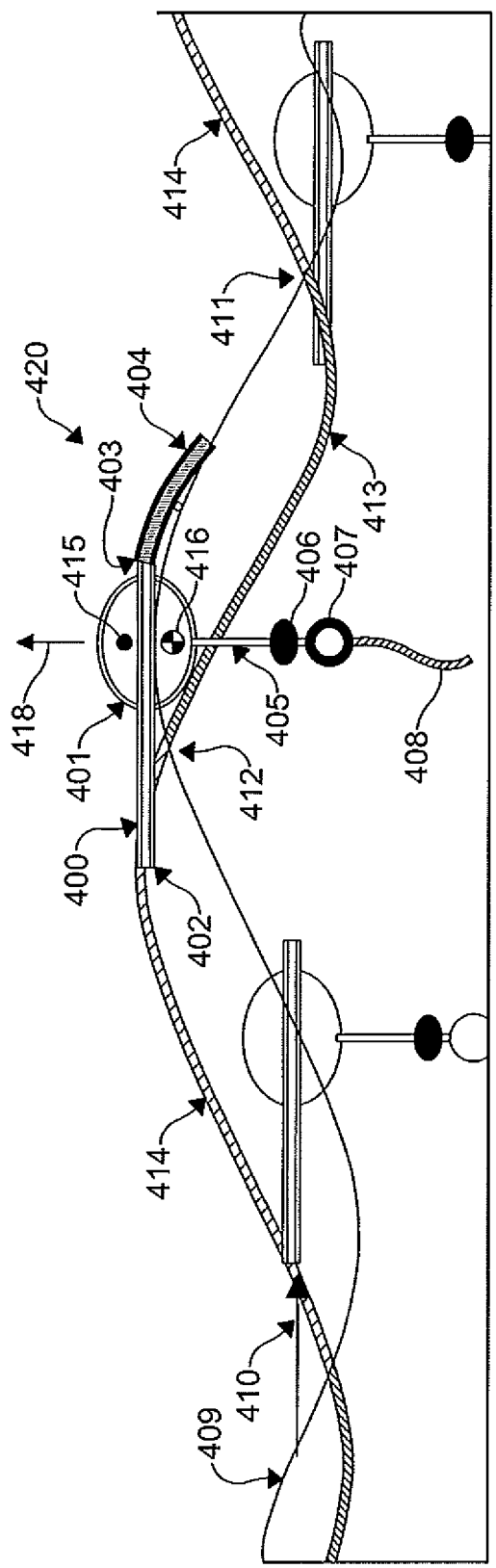
FIG. 4 - SINGLE PIPE TYPE INLET

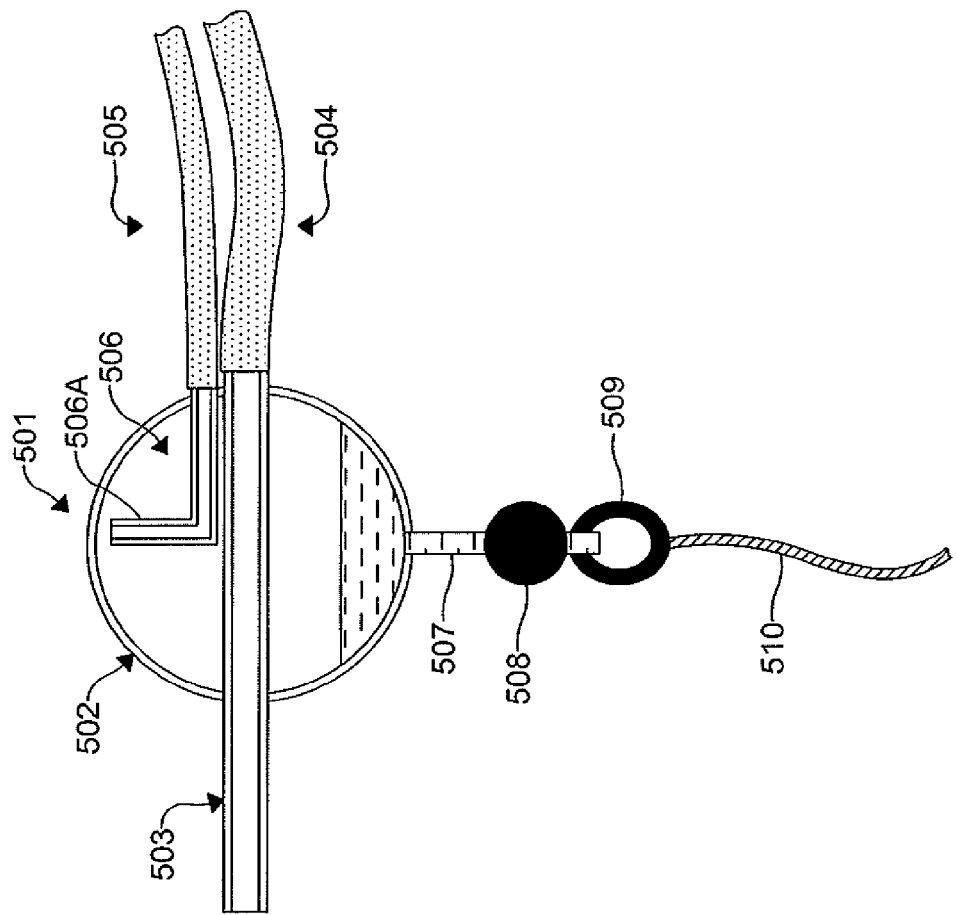
FIG. 5 - INLET VARIABLE BUOYANCY

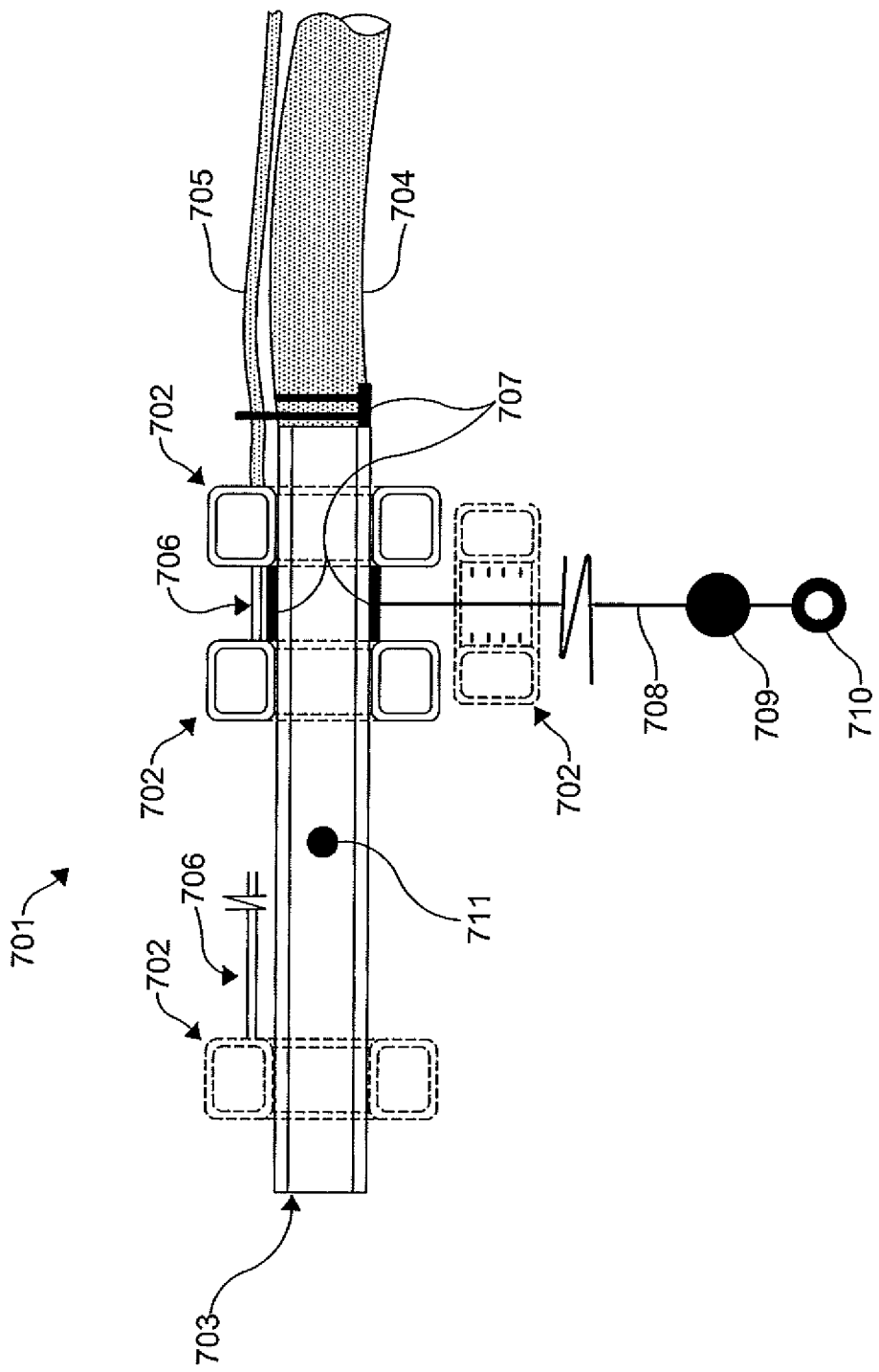
FIG. 7 INLET - INFLATABLE BUOYANCY TANK WITH CONTOL

FREE FLOATING WAVE ENERGY CONVERTER

CROSS-REFERENCE TO RELATED APPLICATION

This application is a continuation-in-part of the co-pending U.S. patent application Ser. No. 11/997,662, filed Feb. 1, 2008, which application is a 371 International application no. PCT/IN2006/000273, filed Aug. 1, 2006, which application claims priority from India patent application no. 694/KOL/2005, filed Aug. 2, 2005.

FIELD OF THE INVENTION

This invention, hereinafter termed as "Free Floating Wave Energy Converter", or FFWEC in short, relates to ocean energy and more particularly wave energy converters (WEC). As against the rest of the state of the art WEC systems, which mostly capture energy from the undulations of waves or surge, almost all in the vertical axis, according to the present invention, energy is extracted from the wave propagation in the horizontal plane.

BACKGROUND OF THE INVENTION

The Wave Energy Converter (WEC) has been known for many years; it was only during the last decade and a half or so that serious efforts were initiated towards exploiting it commercially. Several ocean wave energy conversion devices have since been developed, but only a few matured to full-scale trial stage, but none yet implemented fully on a commercial scale. The main disadvantage of the wave power is the uneconomical cost of extracting wave energy.

Reference is made to patents/applications and/or devices which have some similar components termed flexible pipes and inlets, such as shown in patent documents SU 1129407 A, RU 2004 837 C1, U.S. Pat. Nos. 4,163,633, 5,808,368, 3,333,667, GB-A-2 024 957, WO 84/00583 A and WO 2006/067421.

In the cases cited above the flexible pipe essentially contains devices like the "check valves", or non-return valves, or valves, membranes, baffles, diaphragms, bellows, or combination of these; which are purported to be means for preventing reverse flow and/or to developing pressure. On the contrary, such components not only create extra friction, but under actual wave conditions could even lead to stoppage of the flow altogether. Whereas, the present invention has no components inside the flexible pipe.

Further, since the check valves preclude reverse flow, these devices cannot be classified as "non-positive displacement pumps", wherein reverse flow is a class characteristic, but "positive displacement pumps", instead. Whereas, since reverse is possible in the present invention, it would be classified as a non-positive displacement pump; distinct by classification as well.

The inlets of each of the other systems are also quite different from that of the present invention, in terms of their respective principle of operation, means, methods, construction, arrangement of the components, etc. The Soviet invention (SU 1129407 A) mentions controlling the buoyancy of the tanks, but without reciting either the means or methods of achieving it. Some systems have plurality of inlets and outlets on each flexible pipe. Yet again, all being quite different from the present invention in ways more than one.

The inlet of the present invention is unique. It performs several essential functions, such as ingesting separate and proportioned separate "Slugs" of air and water, without which such a system cannot operate, i.e. if the transverse wave function is to be exploited to convert wave energy, then "Slugs" of air and water must be formed in the "flexible pipe" to create flow and pressure, without which neither can occur.

For instance, in the patent RU 2004 837C1 the flexible pipes are completely and always filled with water. Since the Still Water Level is not inclined, and the waves oscillate on this datum, there can be no gradient created along the pipe. Hence, the water in the said device cannot, and does not flow. The non-return valves/check valves in the pipe would be of no consequence. Whereas, the present invention essentially has "Slugs" of both, air and water.

Further, in the above case "floats" are also attached to the flexible pipe for buoyancy. Whereas, in the present invention, buoyancy to the "flexible pipe" is provided by the air "Slugs".

Furthermore, the flexible pipes in certain cases are bellows, stretchable like a coil spring. Whereas, the present invention has neither.

It could also be appreciated that, all the above methods employ a totally different principle of operation as compared to the present invention, have moving/contacting components, are different in construction, means and methods, and thus prone to suffering the disadvantages similar to those of the other state of the art WECs.

The object of the present invention, therefore, is to overcome the challenges of wave energy, by making it cost competitive with the conventional power.

It is important to note that, in case of the present invention, in the inside of the "Flexible Pipe" there are no contacting components, appendages, non-return valves or check-valves, cavities, openings, holes, diaphragms and the like which exists in the conventional energy converters. Contrary to belief the said non-return valves in the flexible pipe do not prevent the occurrence of surge or stall, hence they have not been provided in the present invention. Non-return valves hinder exchange of fluids between adjacent slugs of air/water, which might normally happen due to variation in the wave parameters.

SUMMARY OF THE INVENTION

The present invention comprises essentially of a flexible pipe, herein after termed as the "Flexible Pipe", of adequate length, or plurality thereof, that floats on the ocean surface and adapts to the wave form, suitably moored so as to maintain the fore and aft axis generally facing towards, for example ±30°, the waves direction. A special "Inlet", integrally attached at the mouth of the flexible pipe, ingests graduated slugs/segments of air and water into the "Flexible Pipe", synchronous with the waves.

Air and water are trapped in the pipe and segregated; due to gravity, into discrete segments or "Slugs" in the crests and troughs of the pipe, respectively. The "Slugs" get pushed by the waves as they propagate from one end of it to the other. Thus, energy is extracted by virtue of the propagation of waves. The "Slugs" can flow even against pressure, if applied at the Outlet. The total pressure in a pipe will be the function of the cumulative differential pressure of all the water "Slugs" in that pipe, less losses.

Fluid pressure is-built up in the "Flexible Pipe" until it is sufficiently high to drive a turbine or pump ocean water into reservoirs, etc. Several such pipes could be grouped together; in series and or parallel, to make a wave energy farm.

If some resistance is applied at the outlet, the water in the troughs will get pushed up the inclines of the previous crests, consequently increasing the pressure in the flexible pipe. If the backpressure exceeds the total pressure head, the system stalls. The pressure is highest at the outlet, and progressively reduces up the pipe, until it becomes negative near the inlet, thus water/air get sucked in as the waves progress. Therefore, the "Flexible Pipe" can also be classified as a non-positive displacement wave pump.

With the rest of the conditions remaining constant, increase in the number of "Flexible Pipes" and length, enhances the flow volume and pressure, respectively. The "Flexible Pipe" not only absorbs energy from the crest of a wave but might also trap it from below it and in its proximity as well. This is because, as energy is progressively being extracted by the "Flexible Pipe" from a progressive wave crest, the wave energy which is below and on either side of the crest will flow in to replenish the energy which is being extracted until almost all its energy is converted. Eventually, the wave dies down. As such, the FFWEC could be categorized as a "Linear Absorber" as opposed to the "Point Absorber" type of WECs.

Energy can only be optimally extracted when the air and water Slugs are uniformly distributed in the crests troughs along the length of the "Flexible Pipe".

An Inlet is a floatable apparatus, flexibly attached at the throat of the "Flexible Pipe" through a rigid "Inflexible Pipe", kept afloat by means of one plurality of buoyancy tanks, inflexible or flexible, with or without provision for controlling buoyancy thereof, either individually or collectively, so as to provide the desirable buoyancy and even ceasing operation by completely sinking or floating the apparatus.

The Inlet functions to impart some Kinetic Energy to the water slug at the time of "zero" start and subsequently to ingest graduated amount/volume of air and water, synchronous with the waves.

In case of inclement wave climate, the "Inlet" functions to ingest only water so as to sink the "Flexible Pipe" wherein flow ceases. And whenever required, ingest only air so as to float the pipe wholly, wherein flow ceases.

Since the pipes, i.e. Inlet and "Flexible Pipes" will essentially be made of specific gravity (SG) higher than that of water "one", they will sink when filled mostly with water. To raise them again, the pneumatic pressure that would generally be available in the "Pressure Chamber" would be used to purge the water out of the pipes. When the pipes resurface, the system will be at "zero start" state (with no water in them). In the case of surge or stall the continuous flow of water stops and the slugs either start oscillating between each passing wave or reverse flow could ensue; since there would be a sudden drop of pressure at the outlet, with the pressure-head remaining constant. Therefore, it should be ensured that the system remains within the safe operating limits. If the system stalls, it would have to be re-started.

Before commencing operation (flow), the "Flexible Pipe" and the Inlet assembly are to be kept empty; else the inertia of the water already collected in the "Flexible Pipe" would impede zero speed start.

During operation, the air and water intake phases or timing can be adjusted/tuned by altering the buoyancy and /or tilting of the "Inlet". In both the above cases only water is ingested to sink the "Flexible Pipe". This is achieved by completely deflating the flexible tanks or flooding the inflexible tanks of the Inlet, as applicable. For stopping flow the buoyancy of the Inlet buoyancy tank is increased to an extent where the mouth of the Inlet cannot enter the waves. Thus, only "air" is ingested and eventually the flow stops.

Alternatively, the buoyancy of the individual tanks can be varied such that the apparatus tilts either forward and back, thereby enabling adjustment of the water/air ingestion timing and even preventing the mouth of the "Inflexible Pipe" from ingesting water altogether. Consequently, the flow will stop after all the water slugs flow out.

The apparatus need not essentially have any moving or contacting components. Whatever control devices are required are preferably located on shore. All components of the above apparatus are made of appropriate dimensions and material.

During normal operating conditions, generally, the length of the Flexible Pipe can be kept more than that of the length of the wave curves. This will make the "Flexible Pipe" float with the "Water Slugs" remaining below the water surface (crests and the "Air Slugs" portion remaining above it). By doing so, first, the effective wave height could be increased from the actual wave height to that adopted by the "Flexible Pipe" and second, it will also help when the wave height increases. The slack in the "Flexible Pipe" will cater for the increase in the wave height, which consequently increases the length of the wave curves.

DESCRIPTION OF THE DRAWINGS

The above as well as other advantages of the present invention will become readily apparent to those skilled in the art from the following detailed description of a preferred embodiment when considered in the light of the accompanying drawings in which:

FIG. 3 shows air and water "Slugs" in the "Flexible Pipe" during idling and pressure flow conditions;

FIG. 4 shows a typical "Inlet" of the invention;

FIG. 5 shows the "Inlet" with buoyancy control;

FIG. 7 shows the "Inlet" with a plurality of inflatable buoyancy tanks and control.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Certain design principles to achieve the desired results are discussed in the succeeding paragraphs.

Figure 1:
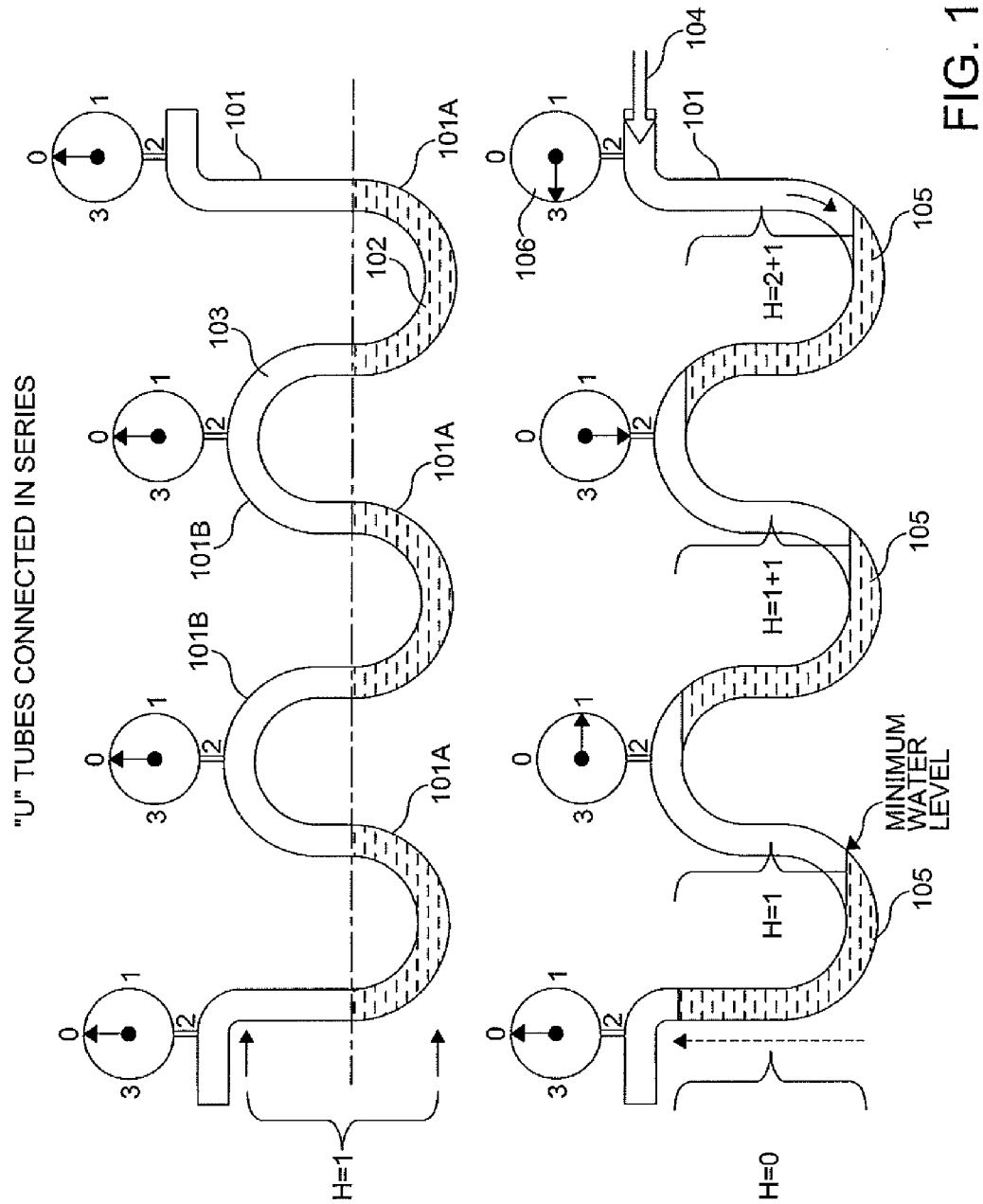
FIG. 1 depicts the principle of operation of the present invention.

FIG. 1 of the accompanying drawings illustrates the behavior of the air and water slugs in a flexible pipe arrangement. For ease of understanding, we have considered the waves to be regular curves, such as in the case of a "U tube manometer", connected in series 101. Let us also assume that, initially, water 102 is filled uniformly in all trough segments 101A of the pipe 101, with air 103 being trapped in crest segments 101B. It can be seen that, since all the segments 101A, 101B are connected in series, any force applied at any point on the pipe 101 will be transmitted throughout the length of the pipe. Thus, if some pneumatic pressure 104 is applied at one end of the pipe 101, it will "push" all the water segments/slugs up preceding crests 105 (against gravity). In other words, a pressure head will be created, which will be equal to the sum total of all the height displacements of the water segments.

For example, if there are three waves of H=1 m each (water displacement in each segment), the cumulative head at the outlet of the pipe 101 will be H=3 m as measured by a meter 106, which head can theoretically be increased till infinity.

Now, instead of above experiment, if we consider a wave train, the opposite will happen; that is, pressure will be generated and the water/air segments will start flowing in the pipe along with the wave train. The invention exploits this characteristic of the wave motion.

Embodiments of the present invention will be described below specifically with reference to accompanying drawings.

Figure 2A:
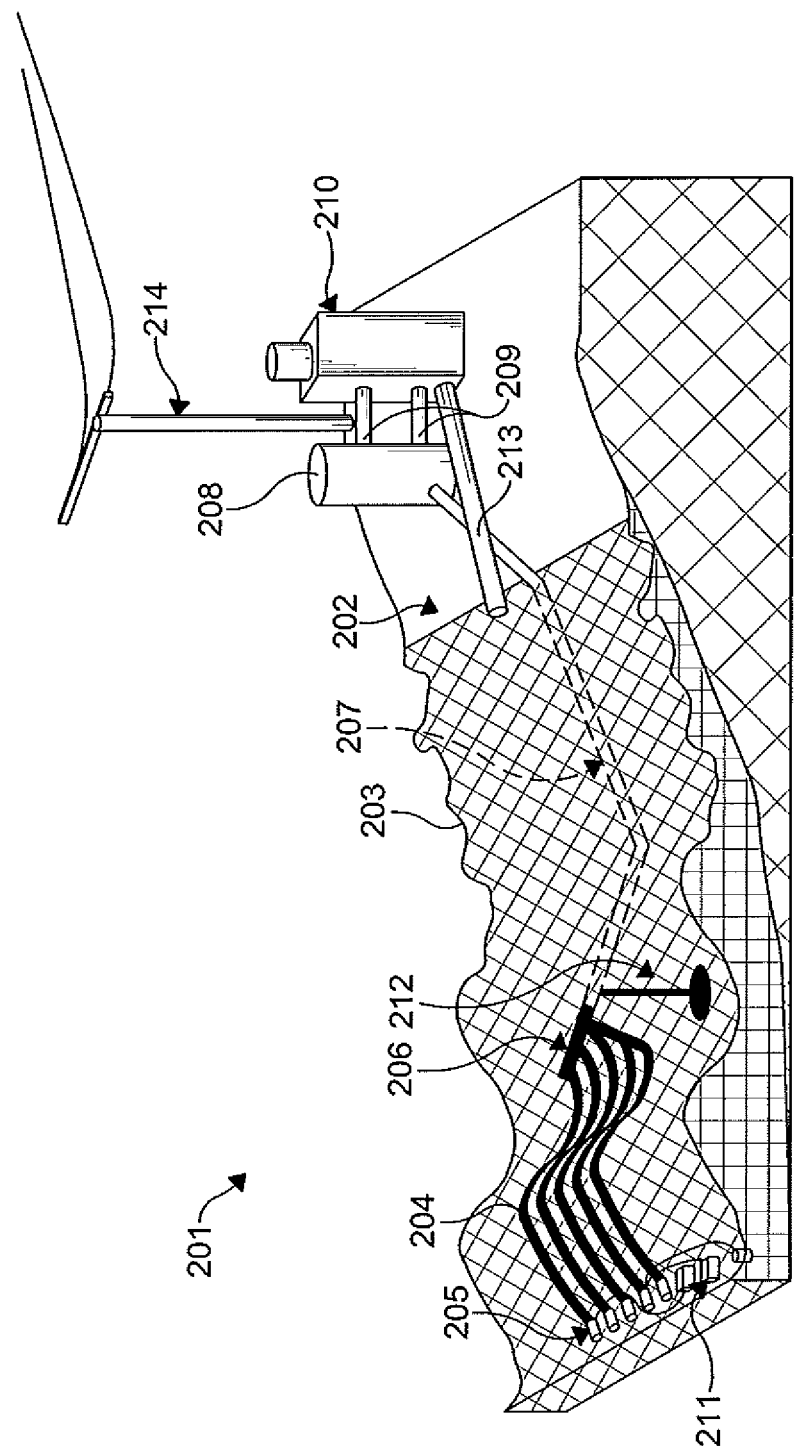
FIG. 2A is an artist's impression in perspective of the "Free Floating Wave Energy Converter" according to the invention.

FIG. 2A depicts an artist's impression of the FFWEC which describes an arrangement 201 depicting waves moving towards a shore 202, reflected waves near shore ("turbulence area") 203, and a plurality of "Flexible Pipes" 204 connected at one end to a plurality of "Inlets" 205, respectively, further connected at opposite ends to a "Manifold" 206. The manifold 206 is connected to a "Hard Pipe" 207 in the "turbulence area" 203, such pipe terminating at a "Pressure Chamber" or "Pneumatic Accumulator" 208. The pressure chamber 208 is connected with "Air and Water Piping" 209 to generators 210. Moorings 211 are provided at the "Inlets" 205; hard pipe supports 212 are provided for the pipe 207; a drain pipe 213 is connected to the chamber 208; and a grid power supply 214 is connected to the generators 210.

Figure 2B:
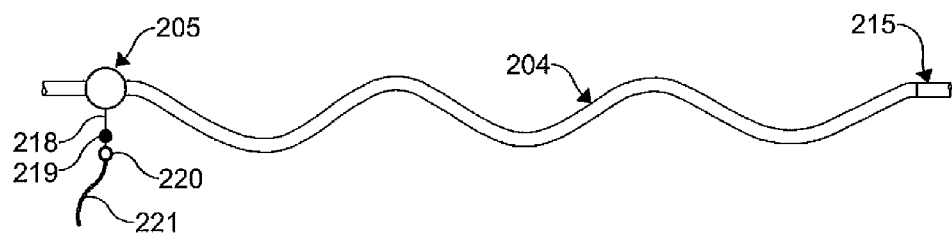
FIG. 2B depicts a preferred embodiment of the invention.

FIG. 2B is an enlarged view of the preferred embodiment of the invention essentially comprising the "Flexible Pipe" 204 connected at one end to the "Inlet" 205. A "Suspension Rod" 218 extends downwardly from the "Inlet" 205 and includes a "Ballast/Damper" 219 and a mooring ring 220. A mooring line 221 is attached to the ring 220. An "Outlet" or coupling 215 is attached to an opposite end of the pipe 204 and is further connected to the following components shown in FIG. 2A.

FIG. 3 of the present invention depicts a "Flexible Pipe" 301 floating on waves, with water 302 and air 303 "Slugs" in sustained flow. A water reservoir 309 connected to the outlet of the pipe 301 is located at an elevation towards the outlet side of the flow representing the extent of a pressure-head 304 on the flow, with the direction of wave motion being from left to right (arrow 305). With no back pressure (no water in the tank 309) the water "Slugs" 302 remain in the troughs of the pipe 301, and with water in the tank 309, the slugs 302 are pushed up the preceding wave crests 306 to generate an increased pressure-head 308 on the flow.

The basic embodiment in FIG. 4 shows an "Inlet" apparatus 420 comprising a single "Inflexible Pipe" 400 protruding sufficiently ahead of a buoyancy tank 401, which tank normally floats on the surface of a body of water 411. Through a mouth 402 of the pipe 400 both air and water can enter and an outlet 403 of the pipe is connected in fluid communication with a front end of a "Flexible Pipe" 404.

Further, the apparatus 420 additionally and generally consists of a "Suspension Rod" 405, either fixedly attached to the apparatus or hinged to it. In the former arrangement, the Suspension Rod 405 could have a "Ballast" and/or "Damper" 406 and a mooring ring 407 with an attached mooring line 408, all suspended below the apparatus, for providing and enhancing stability to the assembly, particularly in a vertical axis 418, that is to minimize the pitching motion of the assembly, while providing freedom to heave—viz. along the vertical axis. These components if positioned below the buoyancy tank 401 minimize the torque that would otherwise be created by the moment arm formed, due to the distance between a Center of Floatation "F" 415 and a center of gravity (CG) 416. Hence, both are kept aligned along the Vertical Axis 418 or nearest thereto.

Whereas, in the former case, the "Inflexible Pipe" has a freedom to pitch around the lateral axis, and as well to heave. The ballast 406 also acts as a "damper", creating drag while moving up and down the waves. Thus, if it is located away from the Center of Floatation "F" 415, somewhere along the fore and aft axis of the Inlet, it would cause torque, thereby making the mouth 402 of the "Inflexible Pipe" 400 pitch up and down while riding the waves; which aspect is discussed subsequently herein below.

It may be noted that, at the time of the "Zero Start" it would be necessary to push water into the mouth 402 of the "Inflexible Pipe" 400, at the required velocity and volume. Therefore, it would be necessary to have a relative motion between the horizontal component of the waves and the "Inflexible Pipe" 400. This does not happen if the "Inlet" 420 pitches along with the waves. The "Ballast" 406 enhances stability of the "Inlet" 420 in the vertical axis 415, thereby minimizing the pitching motion, as required in some embodiments of the present invention. The "Flexible Pipe" 404, which trails the apparatus 420, provides the directional stability. As such, it remains nearly in an upright position and rightly aligned as it floats up and down the waves.

The Inlet 420 generally faces the oncoming waves (direction arrow 410) and is made to float at an appropriate height above the Still Water Level (SWL) by adjusting the buoyancy of the buoyancy tank 401. It typically enters near a trough 411 and exists at a crest 412 of the waves as they pass (for explaining the sequence, the wave in the drawing is shown as stationary while the "Inlet" 420 is shown in three positions, moving from right to the left). When a wave strikes the mouth 402 of the "Inflexible Pipe" 400, the water which enters it is separated from the main water body, while continuing to move through it at the same wave velocity. The "Water Phase" 414 commences from the trough of an oncoming-"Air Phase" 413. Thus, the alternating intake of water and air "Slugs" is appropriately synchronized with the waves.

The device could work without any controlling devices, under fair wave climatic conditions, with average efficiency and reliability. However, since the waves are not regular, provision for optimally controlling and regulating the air and water ingestion timing and volume have also been provided.

The intake volume and timing of air and water "Slugs" are controlled by altering the buoyancy and/or "up-down" tilting of the "Inlet" along its lateral axis. Buoyancy is increased or reduced by filling the buoyancy tanks with air or water, respectively. This enables ingestion of the "Slugs" according to the wave condition. Generally, water and air "Slugs" are alternately ingested, from trough to crest and crest to trough, respectively.

In another embodiment, added to the above assembly is a provision for controlling and regulating the buoyancy, whereby the air and water ingestion timing and volume can be controlled to a certain degree, besides making it possible to ingest only water to sink the apparatus/system in bad weather or stop operations by ingesting only air and totally float it. This embodiment is described in detail below.

FIG. 5 illustrates the above embodiment comprising an "Inlet" apparatus 501 with a "Buoyancy Tank" 502 having an internal "Pneumatic Duct" 506, a top end 506A of which opens in a top portion of the "Buoyancy Tank" 502. The duct 506 is connected through a hose 505 to the "Pressure Chamber" 208 (FIG. 2A) with control devices preferably located thereat, for varying the pneumatic pressure in the buoyancy tank. By varying the pneumatic pressure in the "Buoyancy Tank" 502, water is pushed in/out through a "Water Breathing Tube" 507, a top end of which is fixedly attached to the bottom of the "Buoyancy Tank" 502 and a lower end opening into the sea below, consequently varying the "Inlet" buoyancy, thereby controlling the air and water intake timing and volume. The rest of the arrangements of this embodiment remain similar to those described in FIG. 4 above, including an "Inflexible Pipe" 503, connected to a "Flexible Pipe" 504, a "Ballast" 508 attached to the tube 507, a mooring ring 509 attached at the bottom of the tube 507, and a mooring line 510 attached to the ring 509.

Figure 6:
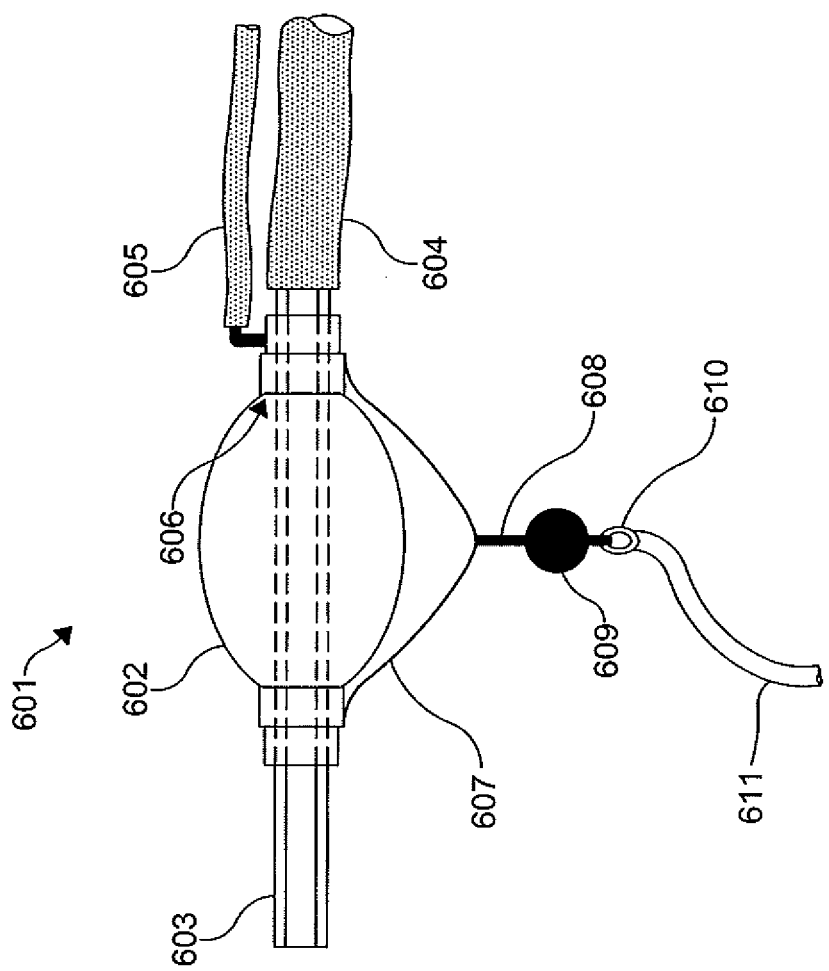
FIG. 6 shows the "Inlet" with an inflatable buoyancy tank and control.

In another embodiment, an "Inlet" apparatus 601, which is illustrated by FIG. 6, includes an "Inflatable Buoyancy Tank" 602 which is directly connected with a pneumatic hose 605 as above, but without the "Pneumatic Duct" and "Water Breathing Tube" (the rest of the arrangements being similar to the previous embodiment described in the above paragraph). The hose 605 terminates at a duct 606 inside the tank 602. An "Inflexible Pipe" 603 is connected to a "Flexible Pipe" 604, a bracket 607 attaches a suspension rod 608 to the pipe 603, a "Ballast" 609 is attached to the rod 608, a mooring ring 610 is attached at a bottom end of the rod 608, and a mooring line 611 is attached to the ring 610.

As can be appreciated, the buoyancy of the "Inlet" apparatus 601 can be varied by inflating/deflating the "Inflatable Buoyancy Tank" 602.

The inflatable variable buoyancy tank 602 could be, as shown in FIG. 6, a spherical shape or any other suitable shape and its principle operation also being similar in each case.

In yet another embodiment illustrated by FIG. 7, an "Inlet" apparatus 701 comprises at least two "Inflatable Buoyancy Tanks" 702, connected individually, in groups or jointly through respective hoses 705 and 706 with the "Pressure Chamber" 208, which is normally shore based and having the pneumatic pressure and controls and switching devices generally installed thereat. The "Inflatable Buoyancy Tanks" 702 are suitably arranged on the "Inlet" apparatus 701, whereby the pitching, i.e. the angle of rotation around the lateral axis of the "Inlet" apparatus and its buoyancy, can be controlled by varying the buoyancy of the "Inflatable Buoyancy Tanks" 702 individually. Also shown are an "Inflexible Pipe" 703 connected to a "Flexible Pipe" 704, brackets 707 for attaching a "Suspension Rod" 708 and the pipe 704 to the pipe 703, a "Ballast" 709 attached to the rod 708, a mooring ring 710 attached to an end of the rod 708, and a "Center of Flotation" (F) 711. The tanks 702 encircle the pipe 703 and also can be positioned on the rod 708.

If the "Damper" 709 is located at a certain distance aft of the "Center of Floatation" (F) 711 (instead of vertically below it as described at FIG. 5 for instance, and the Suspension Rod 708 may be hinged to the apparatus so as to enable pitching, the drag caused by the "Ballast/Damper" 709 would create some torque, which would make the "Inlet" 701 tilt/pitch "up", with (F) as the fulcrum, while it rides up the waves, and vice versa. In this case, the water which would be in the "Inflexible Pipe" 703 during the "Water Phase" 414 (FIG. 4) would also be lifted up by the additional pitching motion of the "Inlet" 701, causing it to fill the empty "Flexible Pipe" 704 at "Zero Start". The angle of rotation of the "Inflexible Pipe" 703 can be varied by changing the buoyancy of the respective buoyancy tanks 702.

In another embodiment, at least two "Rigid Buoyancy Tanks", similar in construction to the "Buoyancy Tank" 502 explained at FIG. 5 above are used, instead of the Inflatable Buoyancy Tank 602 of FIG. 6. The arrangement of the components and their functions is similar to that explained in FIG. 7 above, including the "Inflexible Pipe", the "Flexible Pipe", the "Suspension Rod", the "Ballast" and the mooring ring.

For mooring it is preferable to use mooring buoys could also be used, since the weight of the mooring line would be taken up by them and not act on the "Inlet" or system as such.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wave energy converter comprising:
a flexible pipe having an inlet end and an outlet end, said flexible pipe being free of internal obstructions for permitting a free flow of water in opposite directions therethrough;
an inflexible pipe having an inlet end and an outlet end, said inflexible pipe outlet end being connected to said flexible pipe inlet end; and
a buoyancy tank attached to said inflexible pipe whereby when said flexible pipe, said inflexible pipe and said buoyancy tank are positioned in a body of water along a path of propagation of waves with said inflexible pipe inlet end receiving the waves, said buoyancy tank orients said inflexible pipe causing alternating slugs of water and air to enter said inflexible pipe inlet end and move through said flexible pipe to said flexible pipe outlet end in phase with the waves.

2. The wave energy converter according to claim 1 including a suspension rod connected to said inflexible pipe whereby said suspension rod extends in a downward direction in the body of water.

3. The wave energy converter according to claim 2 including a ballast attached to said suspension rod intermediate opposite ends of said suspension rod.

4. The wave energy converter according to claim 2 including a mooring line attached to said suspension rod for retaining said inflexible pipe and said buoyancy tank at a predetermined location in the body of water.

5. The wave energy converter according to claim 2 wherein said suspension rod is attached by a bracket or a hinge to said inflexible pipe or to said buoyancy tank.

6. The wave energy converter according to claim 2 wherein said suspension rod is a water breathing tube having one end in fluid communication with an interior of said buoyancy tank and an opposite end opening into the body of water.

7. The wave energy converter according to claim 6 including a pneumatic duct of said breathing tube for supplying a pressured gas to control an amount of water in said buoyancy tank.

8. The wave energy converter according to claim 1 wherein said buoyancy tank is attached to an exterior of said inflexible pipe.

9. The wave energy converter according to claim 8 wherein said buoyancy tank is inflatable and an interior of said buoyancy tank is in fluid communication with a duct supplying a pressured gas to control an amount of the pressured gas in said buoyancy tank.

10. A wave energy converter comprising:
a flexible pipe having an inlet end and an outlet end, said flexible pipe being free of internal obstructions for permitting a free flow of water in opposite directions therethrough;
an inflexible pipe having an inlet end and an outlet end, said inflexible pipe outlet end being connected to said flexible pipe inlet end;

a buoyancy tank attached to said inflexible pipe whereby when said flexible pipe, said inflexible pipe and said buoyancy tank are positioned in a body of water along a path of propagation of waves with said inflexible pipe inlet end receiving the waves, said buoyancy tank orients said inflexible pipe causing alternating slugs of water and air to enter said inflexible pipe inlet end and move through said flexible pipe to said flexible pipe outlet end in phase with the waves;

a suspension rod connected to said inflexible pipe whereby said suspension rod extends in a downward direction in the body of water; and a ballast attached to said suspension rod intermediate opposite ends of said suspension rod.

11. The wave energy converter according to claim 10 including a mooring line attached to said suspension rod for retaining said inflexible pipe and said buoyancy tank at a predetermined location in the body of water.

12. The wave energy converter according to claim 10 wherein said suspension rod is attached to said inflexible pipe by a bracket or is attached to said buoyancy tank.

13. The wave energy converter according to claim 10 wherein said suspension rod is a water breathing tube having one end in fluid communication with an interior of said buoyancy tank and an opposite end opening into the body of water.

14. The wave energy converter according to claim 13 including a pneumatic duct in fluid communication with the interior of said buoyancy tank above said one end of said breathing tube for supplying a pressured gas to control an amount of water in said buoyancy tank.

15. The wave energy converter according to claim 10 wherein said buoyancy tank is attached to an exterior of said inflexible pipe.

16. The wave energy converter according to claim 15 wherein said buoyancy tank is inflatable and an interior of said buoyancy tank is in fluid communication with a duct supplying a pressured gas to control an amount of the pressured gas in said buoyancy tank.

17. The wave energy converter according to claim 16 including at least another of said buoyancy tank is attached to said inflexible pipe and an interior of said at least another buoyancy tank is in fluid communication with another duct supplying a pressured gas to control an amount of the pressured gas in said at least another buoyancy tank.

18. A wave energy converter comprising:
at least two flexible pipes each having an inlet end and an outlet end, each said flexible pipe being free of internal obstructions for permitting a free flow of water in opposite directions therethrough;

at least two inflexible pipes each having an inlet end and an outlet end, each said inflexible pipe outlet end being connected to said flexible pipe inlet end of an associated one of said flexible pipes;

at least two buoyancy tanks each attached to an associated one of said inflexible pipes whereby when said flexible pipes, said inflexible pipes and said buoyancy tanks are positioned in a body of water along a path of propagation of waves with said inflexible pipe inlet ends receiving the waves, said buoyancy tanks orient said associated inflexible pipes causing alternating slugs of water and air to enter said inflexible pipe inlet ends and move through said flexible pipes to said flexible pipe outlet ends in phase with the waves; and a manifold connected to said flexible pipe outlet ends for receiving the alternating slugs of water and air.

19. The wave energy converter according to claim 18 wherein each said inflexible pipe includes a suspension rod connected thereto whereby said suspension rods extend in a downward direction in the body of water; and a ballast is attached to each said suspension rod intermediate opposite ends of said suspension rod.

20. The wave energy converter according to claim 18 wherein each said buoyancy tank has a pneumatic duct in fluid communication with an interior of said buoyancy tank for supplying a pressured gas to the interior of said buoyancy tank.

* * * * *